United States Patent
Corrunker et al.

[11] Patent Number: 6,007,344
[45] Date of Patent: Dec. 28, 1999

[54] MULTIPLE BRUSH STEERING WHEEL COMMUTATOR

[75] Inventors: Michael R. Corrunker, Dearborn Heights; Dragan Bogovican, Sterling Heights; LaVerne R. Newman, Southfield; Pavel Bucu, Clinton Township; Paul R. Chandler, Saline, all of Mich.

[73] Assignee: Lear Corporation, Southfield, Mich.

[21] Appl. No.: 08/435,869

[22] Filed: May 4, 1995

Related U.S. Application Data

[63] Continuation-in-part of application No. 08/390,034, Feb. 17, 1995, abandoned.

[51] Int. Cl.$^6$ ................................................. H01R 39/00
[52] U.S. Cl. ............................................................... 439/22
[58] Field of Search ................................ 439/15, 20–22, 439/27, 29, 23–26, 13

[56] References Cited

U.S. PATENT DOCUMENTS

| | | | |
|---|---|---|---|
| 1,975,964 | 10/1934 | Mayhew | 439/20 |
| 3,314,038 | 4/1967 | Rutten | 439/21 |
| 4,705,978 | 11/1987 | Mabuchi | 439/13 |

FOREIGN PATENT DOCUMENTS

| | | | |
|---|---|---|---|
| 1055042 | 2/1954 | France | 439/21 |
| 1414008 | 9/1964 | France . | |
| 2404936 | 10/1977 | France . | |
| 2568421 | 7/1985 | France . | |
| 1293318 | 4/1969 | Germany . | |

*Primary Examiner*—Gary F. Paumen
*Attorney, Agent, or Firm*—Brooks & Kushman P.C.

[57] ABSTRACT

An improved electrical commutator which is particularly useful in a vehicle steering wheel system, includes sets of wire brushes or fingers on a first plate. The wire brushes or fingers contact plural co-planar rings on a second plate. The two plates rotate relative to each other. The wire brushes or fingers decrease the likelihood that any one of the sets will have a short circuit. Should any one of the wires bend, break, or come out of contact with its associated contact ring, there is a likelihood that at least several of the other wires will remain in contact. In addition, there are plural sets of wire brushes or fingers associated with each of the contact rings, again increasing the likelihood that the circuit will remain intact. In other features, the plural sets may be mounted such that circumferentially spaced ones of the sets face opposed directions. In this way, there is no difference in the resistance to rotation, or the quality of the electrical communication, when the wheel is turned either clockwise or counter-clockwise.

20 Claims, 3 Drawing Sheets

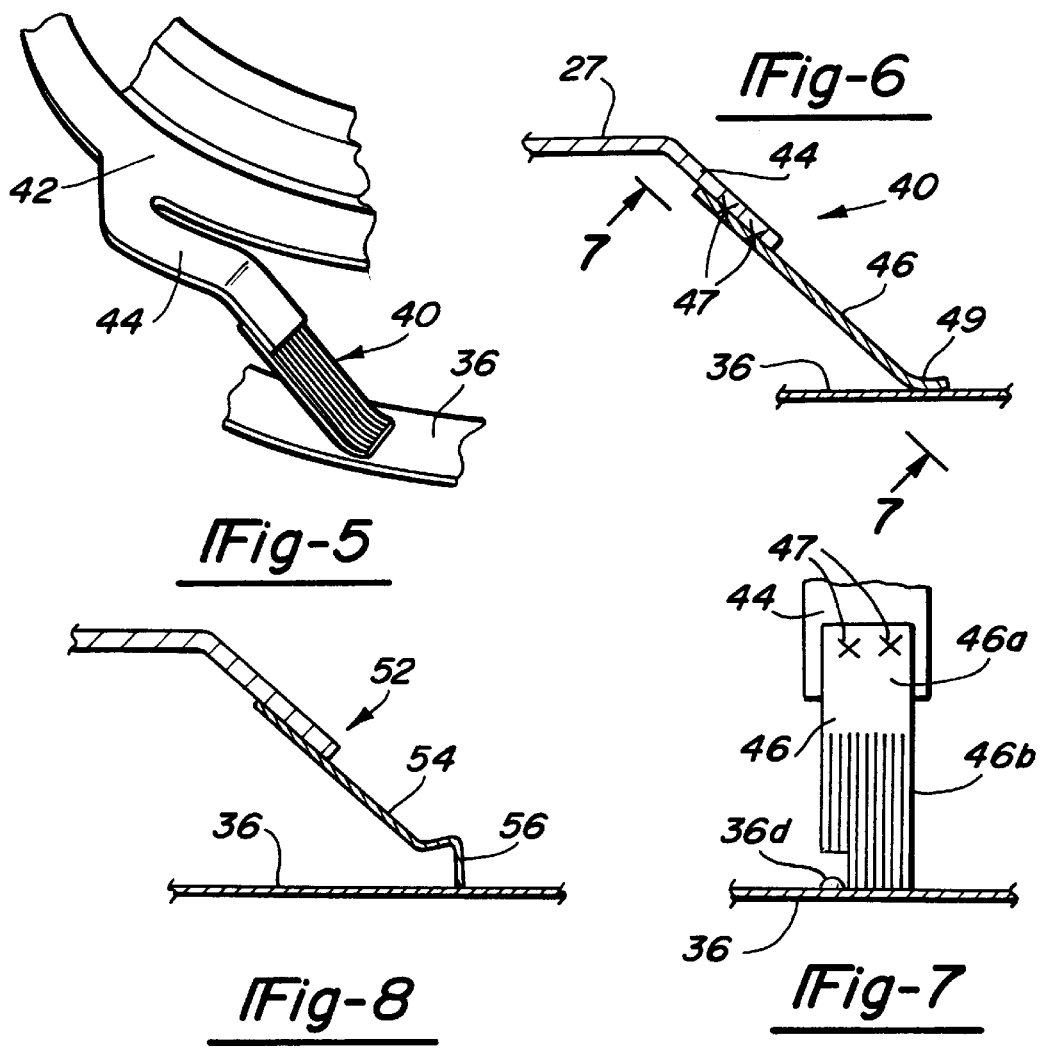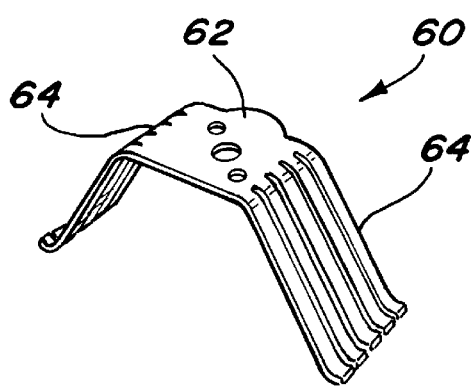

6,007,344

1

MULTIPLE BRUSH STEERING WHEEL COMMUTATOR

This is a continuation-in-part of application Ser. No. 08/390,034 filed on Feb. 17, 1995, now abandoned.

BACKGROUND OF THE INVENTION

This application relates to improvements in electrical commutators for use on two relatively rotating parts.

In the prior art, rotating electrical commutators are utilized to transfer electrical communication between two parts that rotate relative to each other. In one common application, electrical communication between a steering wheel and the fixed steering column is provided by any one of several types of commutators. Since the steering wheel must rotate through several rotations relative to the fixed steering column, some method of communicating electrical signals between the steering wheel and the fixed steering column is necessary that can accommodate relative rotation.

In one standard steering wheel electrical commutator, a wire ribbon physically connects a rotating member to a connection on a fixed member. The wire ribbon is coiled such that several complete relative rotations are allowed. Prior art wire ribbons accommodate approximately three and one-half complete rotations of the steering wheel relative to the fixed steering column in either direction. While this may be adequate rotation, there are some deficiencies in the wire ribbon type of connection.

First, wire ribbons do not allow the use of more than one connection at any axial space. Thus, as the number of electrical communications that must be transferred from the steering wheel to the fixed steering column increase, the required axial length for a commutator utilizing wire ribbons also increases dramatically. Modern vehicle steering systems must communicate many distinct electrical signals between the steering wheel and the fixed steering column. As an example, steering wheels now must carry signals from the cruise control, the air bag system, and the horn. Moreover, other controls such as those for the radio or lights are being designed into the steering wheel. Thus, electrical commutators are needed that will reliably communicate many electrical signals between the rotating steering wheel and the fixed steering column. The relatively large wire ribbons would require excessive amounts of axial space to communicate all of the required signals.

In any automotive environment, it is necessary to minimize the required space. Thus, due to the large axial space requirements, wire ribbon commutators have limited application.

In addition, while wire ribbons are capable of providing acceptable amounts of relative rotation, they may only do so when they have been precisely mounted between the rotating and fixed members. That is, the wire ribbon may be able to provide three and one-half complete rotations in either the clockwise or counterclockwise direction, but only when the wire ribbon has been properly mounted between the rotating and non-rotating members. Should the wire ribbon be mounted improperly, it could, as an example, allow six complete rotations in a first direction, but only one in the other direction. This would, of course, be undesirable.

The other main type of steering wheel commutator has been a single connection point that rotates with the rotating member along a ring on the fixed member. Such commutators do not require the precise positioning of wire ribbons, nor do they require large amounts of axial space. However, the single contact point rotary commutators have not always

2 operated as desired. As one example, should the single contact point break or bend out of contact with the ring, there is no longer any electrical communication between the rotating and fixed member.

With the prior art single contact points, contamination or dirt on either the contact point or the ring could cause the contact point to come out of electrical communication with the ring. In addition, with a single contact point, should there be a scratch or bump at any radial location on the ring, the electrical contact could move out of contact with the ring, thus breaking the electrical circuit. Also, the vibration on the connection could cause the single electrical contact to come out of contact with the ring. This is, of course, undesirable.

There has been one proposed system that utilized several wires held in contact with a ramped ring. This system would not be capable of transmitting several signals and also requires undue axial space.

Similarly, the prior art single contact points extend at an angle toward the other ring. The angle orientation in the clockwise direction could cause more resistance to turning in the counter-clockwise direction and vice versa. Moreover, the integrity of the electrical connection would also be different between the clockwise and counter-clockwise directions.

SUMMARY OF THE INVENTION

In disclosed embodiments of this invention, an electrical commutator contains a non-rotating plate and a rotating plate. One of the plates is provided with a plurality of radially spaced co-planar electrical contact members. The plurality of electrical contact members each individually contact a contact ring to provide electrical communication between the rotating and non-rotating plates. Several circuits are provided by using plural radially spaced co-planar contact rings. Should one of the plurality of electrical contact members bend or break, the other electrical contact members still provide an electric circuit. Moreover, should there be a bump, scratch or other discontinuity in the contact ring, while some of the plurality of electrical contact members may move out of contact, other contact members would be in a radial position where there is no such discontinuity. Those other contact members remain in contact with the ring keeping the electrical circuit intact.

In a preferred embodiment of this invention, the plurality of electrical contact members are provided by a wire brush containing ten separate wires welded to a contact tab fixed to one of the rotating and non-rotating plates. The single contact tab provides a more secure connection than the prior art plural wires. Other numbers of wires may be used, but preferably more than five are used to increase the number of separate electric connectors. In a preferred embodiment, the plate which does not include the contact members includes several co-planar electrical contact rings extending about the entire circumferential extent of that plate. Thus, the plurality of contact members may rotate through a complete rotation, but will remain in contact with the contact rings throughout each rotation. There is no limit on the number of rotations, as the plurality of contact members can continue to rotate along the ring. In one other preferred embodiment, a stamped conductive member has a contact tab formed with integral fingers that provide the electrical connection.

In other preferred features of this invention, there are plural sets of the plurality of contact members associated with each of said contact rings. As an example, one contact ring may have sets of the plurality of contact members at two locations spaced by 180°. For more critical functions, it may be desirable to increase the number of sets of contact members such that they are disposed at every 90°, or even more frequently. The greater the number of sets of contact members, the smaller the likelihood of an open circuit.

In a further preferred embodiment of this invention, the wire brushes or fingers extend from a plate at an angle that is not directly perpendicular to the other plate. Thus, the wire brushes approach the associated contact ring at a non-perpendicular angle. The wires are preferably maintained against the contact ring with a small spring force. In one embodiment, an end of the wire brush or finger is bent perpendicularly relative to the angled portion to be in contact with its associated contact ring. In another embodiment, an end of the brush or finger contacts the contact ring and then bends back upwardly away from the contact ring.

In a most preferred embodiment of this invention, the angled wire brushes or fingers are mounted such that at least some of the sets of brushes or fingers extend in different directions from others of the sets of brushes or fingers. That is, while a first set of brushes or fingers associated with one of the contact rings may extend counter-clockwise from its plate, another of the sets of brushes associated with that same contact ring may extend counter-clockwise from its plate. In this way, the brushes or fingers are properly positioned to provide good electrical contact whether the two plates are rotating counter-clockwise or clockwise relative to each other.

In a most preferred embodiment of this invention, the contact rings may be insert molded into the plate. Further, the brushes are preferably welded to the mounting tabs, which are then connected into the associated plate. The wire or fingers are preferably formed of a metal that has both good electrical conduction properties and spring properties. In a most preferred embodiment of this invention, the plate which receives the brushes or fingers also includes rings that extend between each of the several sets of brushes to provide electrical communication between the sets of brushes or fingers. Known electrical contacts extend from each of the plates to their associated destinations.

These and other features of the present invention can best be understood from the following specification and drawings, of which the following is a brief description.

BRIEF DESCRIPTION OF THE DRAWINGS

FIG. 5 shows a connection of the electrical brushes according to the present invention.

FIG. 6 is a side view of a first embodiment of a wire brush.

FIG. 7 is a view along line 7—7 as shown in FIG. 6.

FIG. 8 is a side view of a second embodiment of a wire brush.

FIG. 9 is a perspective of an alternative to the wire brush embodiments.

DETAILED DESCRIPTION OF A PREFERRED EMBODIMENT

Figure 1:
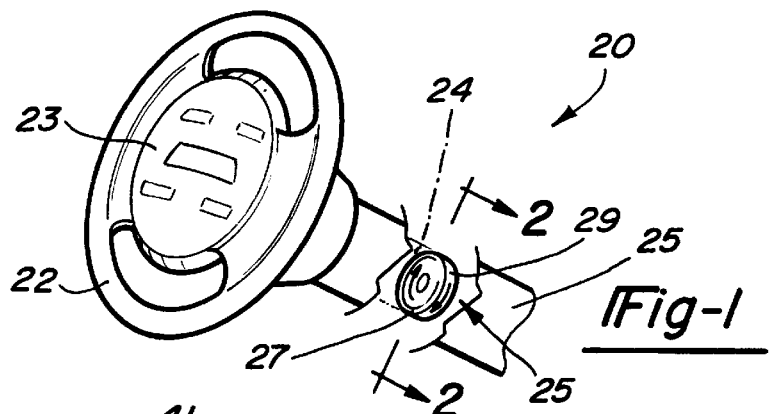
FIG. 1 is a perspective schematic view showing a steering wheel system incorporating the present invention.

FIG. 1 schematically shows a vehicle steering system 20 incorporating a steering wheel 22. As shown, a panel 23 associated with the steering wheel may include several electrical signalling buttons, and also the air bag system. As is known, a portion of the steering wheel system, here shown schematically at 24, rotates with the steering wheel, while the steering column 25 remains fixed. An electrical commutator 28 is shown schematically including a rotating plate 27 and a fixed plate 29. The electrical commutator 28 allows communication of electrical signals between the electrical switches and components associated with the steering wheel 22 to the vehicle control.

Figure 2:
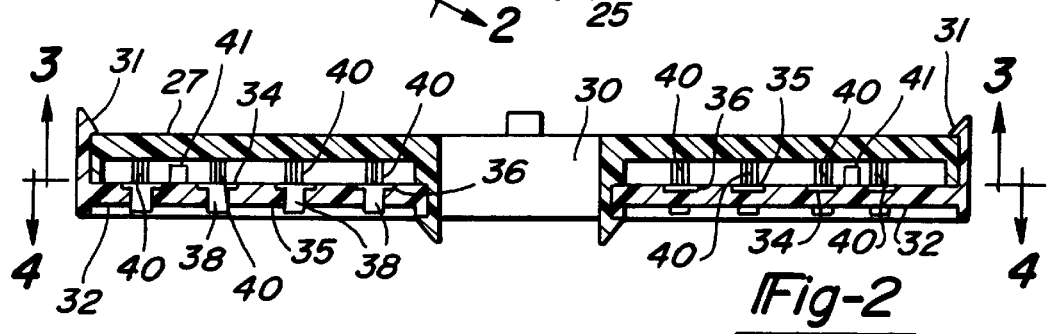
FIG. 2 is a cross-sectional view through an electrical commutator according to the present invention along line 2—2 of FIG. 1.

As shown in FIG. 2, plate 27 incorporates a hole 30 to receive a shaft for mounting the plate 27 to a rotating member for rotation relative to the fixed plate 29 and tabs 31 holding the plates 27 and 29 in proximity to each other. A plurality of co-planar contact rings 32, 34, 35 and 36 are formed on plate 29, and are each associated with a separate electric circuit. As an example, ring 32 may be associated with a vehicle horn, ring 34 may be associated with the air bag, and ring 36 may be associated with the cruise control. It should be understood that practical applications of this invention may include more than four circuits; however, for the sake of simplicity, only four circuits are illustrated in this Figure. Electrical connections 38 extend from each of the rings 32, 34 and 36, to associated connections in the steering wheel 22.

The present invention includes a plurality of sets of electrical connections 40 extending from one of the plates, here 27, to the other plate 29. It should also be understood that while the electrical connections 40 are shown extending from the rotating plate 27 to the non-rotating plate 29, the electrical connections 40 could also be mounted on the non-rotating plate, and the co-planar rings 32, 34 and 36 mounted on the rotating plate.

As will be explained below, the electrical connections 40 preferably include wire brushes or fingers. In one embodiment, there are more than five of the wires in each brush aligned side by side and extending radially outwardly. More preferably, there are ten or more wires in any one brush. Should one of the wires in a brush bend or break, the other wires still provide the electric circuit. This dramatically decreases the failure rate for the electrical commutator. As an example, in the prior art one contact point system, if there was a failure rate of one in a thousand, the use of ten contacts, each having a failure rate of one in a thousand, should decrease the failure rate to an infinitesimally small number.

As also shown in FIG. 2, walls 41 may be integrally molded with plate 29 to provide separation between the co-planar contact rings. Again, for simplicity, walls 41 are not illustrated between each of the rings, although they may be used between each contact ring.

Figure 3:
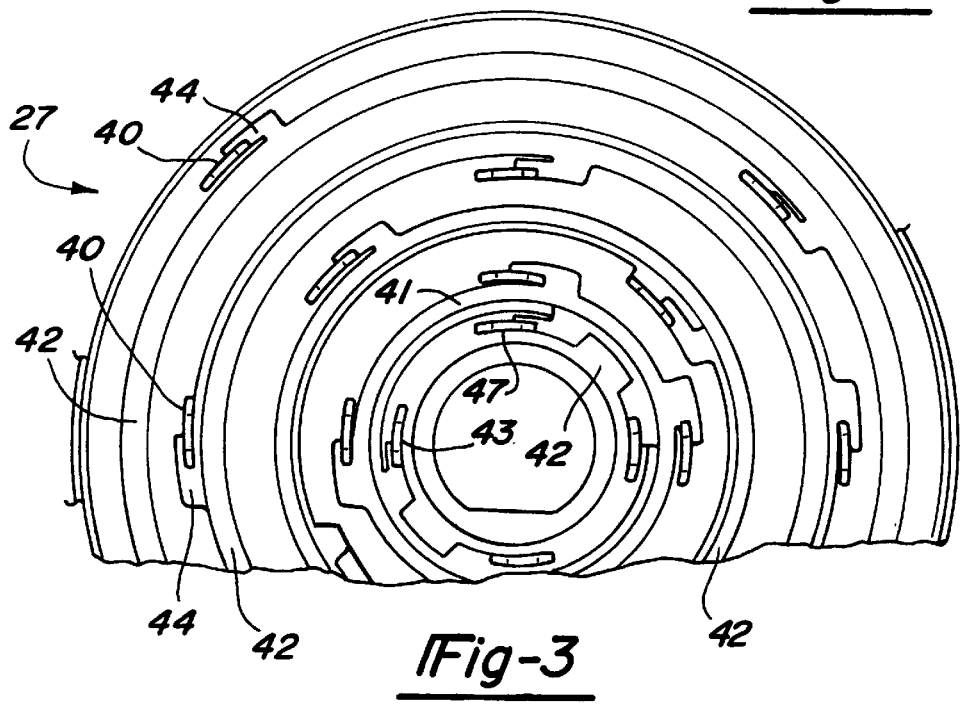
FIG. 3 is a plan view of a first plate incorporated into the present invention.

As shown in FIG. 3, the plate 27 incorporates rings 42 extending between sets of brush mount tab locations 44. Each brush mount tab 44 mounts one of the sets 40 of the wire brushes. As shown, the rings 42 may mount sets of brushes 40 at only two locations spaced circumferentially by 180° as shown at 41. However, other rings 42 may have greater numbers of sets of brushes 40. In the other rings shown, there are sets of brushes 40 mounted at each 90° increment. Typically, additional sets are used for the more critical functions, such as the air bag connections.

As also shown, the connections shown at 43 and 47 associated with one of the rings 42 face each other. As will be explained below, the wire brushes 40 extend at an angle from plate 27 towards plate 29. When the brush sets 43 and 47 face each other, one of the sets will be angled into the rotation whether the rotation is in a clockwise or a counter-clockwise direction. Thus, there will be no more resistance to rotation in one direction than there would be to rotation in the other direction. The reliability of the electrical connection will not differ between rotation in the clockwise or counter-clockwise directions.

Figure 4:
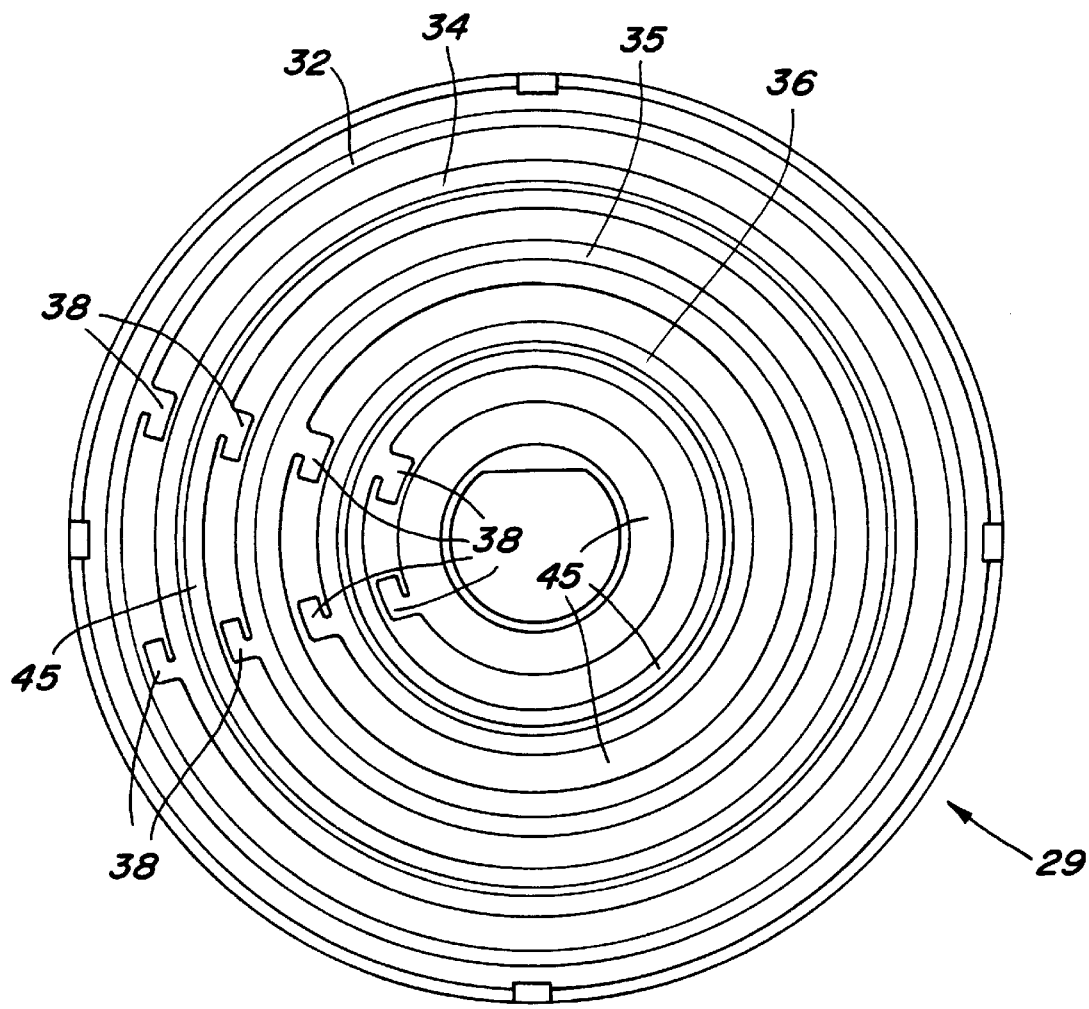
FIG. 4 is a plan view of a second plate of the present invention.

FIG. 4 is a plan view of the plate 29 having the contact rings. As shown, the rings 32, 34, 35 and 36 extend around the entire circumference of the plate 29. Further, as shown, the connection portions of 38 extend through the plate, and are connected to other electrical members to pass the electrical communication on. The details of the connection between connection portions 38 and the remaining electrical portions, and the details of the other electrical portions of the system, are as known in the art, and form no portion of this invention. Also, since the rings are co-planar, a large number of rings can be placed in a limited axial space.

As shown, the plate 29 can be formed with many radially spaced co-planar contact rings. Contact rings 45 are shown at the innermost radial portion of the plate 29, and also spaced slightly radially inwardly from each of the rings 32, 34, 35 and 36. For the sake of simplicity, fewer rings were illustrated in FIG. 2; however, FIG. 4 does show the ability to communicate many electrical circuits through the inventive commutator 28 in a small axial space.

FIG. 5 is a view looking downwardly at the wire brush connections, with the plate 27 removed for clarity. As shown in FIG. 5, the brush mount tab 44 mounts a set of thin wires 40. The wires are mounted side by side relative to each other in a direction extending radially outwardly relative to an axis of rotation. As one plate rotates, the wires slide along ring 36, maintaining an electric circuit. The greater number of individual wires increase the reliability of the overall connection by providing additional separate connections. The use of the single tab 44 to connect to the ring provides a more secure connection than the prior art use of connecting several individual wires.

As shown in FIG. 6, in a first embodiment, the wire brush sets 40 include wires 46 extending at an angle that is non-perpendicular to the plate 29. The wire brushes 46 are welded at two weld points 47 to the tab 44. A bend portion 49 is in contact portion with ring 29. As shown, the wire brush contact portions 49 move along the contact ring 36 on the plate 29. As should be understood, the plates 27 and 29 are mounted sufficiently close axially such that the contact portion 49 is held by a small spring bias force in contact with the ring 36, assuring a good electrical connection.

FIG. 7 is a view along line 7—7 as shown in FIG. 6. As shown, wire brush set 40 includes a top portion 46a welded at 47 to the tab 44. Wire brush set 40 can be formed with a solid top portion 46a and with a plurality of separate wire ends 46b at the contact end. The plurality of wire ends 46b allow any one of the brush ends to come out of contact with the contact ring 36, while still providing other brush ends that will remain in contact. As shown, a discontinuity 36d at a particular radial portion of contact ring 36 could cause the leftmost two of the wire ends 46b to come out of contact with the contact ring 36. However, there are others of the wire end 46b which remain in contact with the contact ring 36. In a single contact member commutator, once the single member moves out of contact there is an open circuit. Although a specific wire brush set is illustrated in this figure, it should also be understood that the solid top portion 46a could be replaced with a plurality of wholly separate wire portions 46b.

FIG. 8 shows an alternative embodiment 52 wherein the wire brush 54 extends at an angle relative to the plate 29 to an end 56 that is bent to extend perpendicularly into contact with a ring, here 36. Again, a small spring bias force maintains end 56 in contact with ring 36.

An alternative embodiment 60 is shown in FIG. 9. In alternative embodiment 60, rather than utilizing a plurality of wires welded to a tab, contact member 60 is stamped from a single piece of metal. A central tab portion 62 is connected to the rotating plate, and a plurality of fingers 64 are individually stamped out of the single piece of metal to extend from tab 62. In the embodiment specifically shown in FIG. 9, fingers 64 extend in both directions at an angle from central tab 62.

In a preferred embodiment, the plates 27 and 29 are formed of a non-conductive material. The rings 32, 34, 36 and 42 may be insert molded into the plates. Electrical connections extending away from the plates have appropriate connections or terminals. Either of the rotating or fixed plates 27 and 29 may be part of another assembly such as a multi-function switch or housing. Further, either or both plates 27, 29 could be the rotating plate.

The rotating plates may be formed of self-lubricating material, such as PTFE. The circuit material formed on the plates may be known substrate material with copper lamina. One such material might be FR-4 substrate with a two-ounce copper laminate. The cooper traces may be electroplated with five micro-inches of nickel to create a base for a 30-micro-inch of rhodium, which is then plated over the nickel for a final finish. The circuit spacing has some design minimum between each of the contact rings. In one embodiment, the minimum circuit spacing was found to be 0.635 millimeter. To determine the required spacing, a dielectric strength test may be required. In such tests, 440 volts of DC current may be applied for one second. The dielectric strength of adjacent circuits must not exceed 500 micro amps leakage at room temperature. If this test is passed, then one can determine that a minimum spacing may well be provided. The substrate thickness for the plate is preferably between 0.020 to 0.250 inch. Known rigid boards typically have a thickness of about 0.01625 inch (1/16 inch). The width of the ring should be as generous as possible to accommodate nominal amounts of nicks, etc., and still function. At the same time, the width of the circuit increases the required radial space for each contact ring and thus decreases the available number of contact rings in any one application. Z-wire or plated through hole connections may be utilized. These are known types of electrical connectors, and a worker of ordinary skill in the art will be familiar with these terms. The substrate material may be any one of several known base materials. As an example, known base materials include phenolic-resin impregnated paper, acrylic-polyester impregnated random glass mats, epoxy-impregnated paper, or epoxy-impregnated fiberglass cloth. There is also a recently developed technique for depositing copper circuit traces directly on teflon. This might be a beneficial way of forming the plate. The material for the multi-finger members may be selected from three main groups, including coppers, precious metal alloys, and bi-metals. Suggested copper alloys to be used for the contacts are beryllium copper, nickel silvers, phosphorous bronze, and pfinodal materials. The precious metal alloys may include palladium-silver-platinum alloys or palladium-silver-platinum-gold alloys. The bi-metals may include combinations of the low cost copper alloys with the performance advantages of the precious metal alloys. One example would be a pfinodal and palladium-silver-platinum combination. The pfinodal would be the base metal and the palladium-silver-platinum would provide a precious metal outer surface. It has also been considered that it might be valuable to provide a heating element within one of the plates to prevent icing over of the contact rings directly on the surface.

A preferred embodiment of this invention has been disclosed; however, a worker of ordinary skill in the art would recognize the certain modifications that come within the scope of this invention. For that reason, the following claims should be studied to determine the true scope and content of this invention.

We claim:

1. A rotating electrical commutator comprising:
   a first plate facing a second plate, said first and second plate being mounted to rotate relative to each other about an axis of relative rotation;
   one of said first and second plates having a plurality of electrical contact rings each extending circumferentially about said axis, and the other of said first and second plates having sets of electrical contact members, each set comprising a plurality of electrical contact members aligned side by side and extending from said other plate and each of said sets extending into contact with one of said electrical contact rings, the plurality of electrical contact members decreasing the likelihood of disconnection between any one of said sets and said electrical contact rings; and
   each said set of electrical contact members including a plurality of wires, said wires forming a wire brush, said wire brushes being welded to mount tabs, and said mount tabs being fixed to said other of said plates.

2. An electrical commutator as recited in claim 1, wherein there are plural sets of said plurality of wires at spaced circumferential locations in contact with at least one of said contact rings.

3. An electrical commutator as recited in claim 2, wherein at least one of said plurality of contact rings is in contact with greater numbers of said sets than others of said plurality of contact rings.

4. An electrical commutator as recited in claim 2, wherein said wires extend at an angle that is non-parallel to said axis.

5. An electrical commutator as recited in claim 4, wherein at least some of said circumferentially spaced sets of said wire brushes extend at angles towards each other, such that a first of said sets of wire brushes extends counter-clockwise from said other of said plates, and a second of said sets of wire brushes spaced circumferentially from said first set, extends clockwise from said other of said plates.

6. An electrical commutator as recited in claim 4, wherein said wires extend at an angle from said other of said plates to an end portion, and said end portion extending generally parallel to said axis and toward said one of said plates to contact said contact ring.

7. An electrical commutator as recited in claim 4, wherein said wires extend at said angle directly into contact with said one of said plates, and an end of said wire brush then extends axially away from said one of said plates at an angle.

8. An electrical commutator as recited in claim 2, wherein a contact ring provides electrical communications between associated ones of said plural sets of wires.

9. An electrical commutator as recited in claim 1, wherein said electrical commutator is utilized in a steering wheel of a vehicle.

10. An electrical commutator as recited in claim 1, wherein said one of said plates is formed of a plastic material, and said contact rings are insert molded into said plastic material.

11. An electrical commutator as recited in claim 1, wherein walls are formed on said one of said plates, and extending between said co-planar electrical contact rings toward the other of said plates to provide separation between said plurality of co-planar electrical contact rings.

12. A rotating electrical commutator comprising;
    a first plate facing a second plate, said first and second plate being mounted to rotate relative to each other about an axis of relative rotation;
    one of said first and second plates having a plurality of electrical contact rings each extending circumferentially about said axis and at different radial distances from said axis, and the other of said first and second plates having sets of electrical contact members, each set comprising a plurality of electrical contact members aligned side by side and extending from said other plate and each of said sets extending into contact with one of said electrical contact rings, the plurality of electrical contact members decreasing the likelihood of disconnection between any one of said sets and said electrical contact rings; and
    said plurality of electrical contact members including a plurality of wires, said wires in each of said sets includes wires aligned in a side-by-side relationship in a generally radially outward direction, said plurality of said electrical contact members being formed from a single stamped piece of metal, said single stamped piece of metal having a tab portion fixed to said other of said plates, and a plurality of individual metal fingers extending from said tab portion into contact with said co-planar electric contact rings.

13. An electrical commutator as recited in claim 12, wherein said fingers extend from said tab in both circumferential directions.

14. A vehicle electrical communication system comprising:
    a steering wheel for steering a vehicle, including electric components mounted to rotate with said steering wheel;
    a first plate mounted to rotate with said steering wheel, electrical communication from said steering wheel components extending to said first plate;
    a second plate mounted facing said first plate, said second plate being fixed relative to said first plate, such that said first plate may rotate with said steering wheel relative to said second plate about a central axis;
    one of said first and second plates being provided with a plurality of contact rings extending circumferentially about said axis, the other of said first and second plates being provided with sets of electrical contact members, a single tab being connected to each said set of electrical contact members, said single tab being fixed to said other of said first and second plates, each of said sets of contact members including a plurality of electrical contact members, and at least one of said sets being in contact with each of said contact rings, the plurality of electrical contact members decreasing the likelihood that any one of said sets will lose electrical communication between said first and second plates; and
    said plurality of contact members including plural wires aligned in side-by-side relationship in a generally radially outward direction, said wires extending at an angle toward said one of said plates that is non-parallel to said axis, said wires extending at an angle from said other of said plates to an end portion, and said end portion extending generally parallel to said axis and toward said one of said plates to said contact ring.

15. A vehicle system as recited in claim 14, wherein said rotating first plate is provided with said electrical contact members.

16. A vehicle system as recited in claim 14, wherein at least there are circumferentially spaced sets of said wires which extend at angles towards each other, such that a first of said sets of wires extends counter-clockwise from said other of said plates, and a second of said sets of wires spaced circumferentially from said first set, extends clockwise from said other of said plates.

17. A vehicle system as recited in claim 14, wherein said contact rings are flat and co-planar.

18. A vehicle system as recited in claim 17, wherein walls extend from said one of said plates toward said other of said plates, said walls being between said co-planar contact rings.

19. A vehicle system as recited in claim 14, wherein said sets of contact members each include a single tab fixed to said other of said plates, with a plurality of integral electrical contact members extending from said tab into contact with said contact rings.

20. A vehicle system as recited in claim 19, wherein said electrical contact members extend from said tab in both circumferential directions at an angle toward said one of said plates.

* * * * *